Patented Feb. 24, 1942

2,274,412

UNITED STATES PATENT OFFICE 2,274,412

METHOD OF PREPARING FREE ALIPHATIC BASES

William H. Hill, Mount Lebanon, Pa., assignor to American Cyanamid Company, New York, N. Y., a corporation of Maine No Drawing. Application December 8, 1939, Serial No. 308,133

3 Claims. (Cl. 260—564)

The present invention relates to a method of producing free organic bases, particularly those which are thermally unstable or sensitive to elevated temperatures.

In the past, the preparation of free organic bases has represented a considerable problem. In those cases where the bases are volatile, the problem of liberating them from their salts and recovering them by distillation is not difficult, except for instance, where they are mixed with ammonia salts and form constant-boiling mixtures with ammonia.

A more difficult problem is experienced when high-boiling bases or practically non-volatile bases are to be liberated, because a simple causticization is not sufficient. Alkaline earth hydroxides must be used and the bases must be in the form of their sulfates or carbonates so that insoluble alkaline earth sulfates or carbonates can be formed which are then removed by filtration, whereupon the aqueous solution of the free base is concentrated. This precipitation with alkaline earth hydroxides has to be carried out in rather dilute solution so that the mixture does not set solid, and even then the filtering of the resultant sludge is a tedious procedure. Moreover, the resulting dilute aqueous solutions of the bases require a great expenditure of heat for the evaporation of the water, and this evaporation often has to be done in vacuum because many of these bases are not thermostable.

In accordance with the present invention, the above difficulties are overcome by utilizing liquid ammonia as the causticizing agent when organic bases weaker than ammonia are to be liberated. If bases stronger than ammonia are to be liberated, an auxiliary causticizing agent of sufficient strength such as, for example, an amine or an alkali metal amide may be added to the liquid ammonia, the latter then serving predominantly as a solvent, or where the auxiliary base is a liquid, it may be used alone.

Various alkyl, alkylol, aryl, aralkyl, heterocyclic and polyamines, such as for example the mono and dimethyl, ethyl, propyl and butyl amines, benzylamine, diethyl benzyl amine, ethylene diamine, piperidine, alkali metal amides, etc., which have a dissociation constant greater than that of ammonia, are suitable as auxiliary causticizing agents, either with or without liquid ammonia.

In carrying out this invention, an organic base in the form of its salt, such as the sulfate, phosphate, oxalate, phthalate, etc., is preferably finely ground and stirred into a quantity of liquid ammonia sufficient to provide a thin paste or slurry. The base is liberated and passes into solution in the liquid ammonia, whereas the acid radical unites with ammonia and precipitates out as an insoluble ammonium salt. The precipitate is filtered off and resuspended in fresh liquid ammonia, if so desired. The filtrate or combined filtrates are allowed to evaporate and the free base is thus obtained in anhydrous form.

The process thus far described provides for the liberation of organic bases weaker than ammonia. Organic bases stronger than ammonia may not be so liberated, or only with low yields. Therefore, in order to produce the stronger bases, it is necessary to add an auxiliary liberating agent to the ammonia in amounts sufficient to take care of the acid radical of the base. As above, the desired free organic base dissolves in the liquid ammonia and is obtained as described.

While the essential feature of the present invention lies in the use of liquid ammonia either alone or in conjunction with an auxiliary liberating agent in producing free organic bases, it may be desirable in some cases to employ strong aqueous ammonia or to pass ammonia gas into the aqueous solution or suspension of the base compound until the free base is liberated and the by-product ammonium salt precipitated. An ammonia solution containing not more than 40 per cent of water is satisfactory. The free base which is thus obtained in aqueous solution may be useful as such, or the liquid may be freed of its ammonia content by gentle warming, leaving a strong aqueous solution of the free base. Such a solution may be used for the production of any desired salt of the base.

The invention will be further described in conjunction with the following specific examples; all of which were conducted at about —32° C.

Example 1

200 grams of pulverized guanyl urea sulfate were introduced into a quantity of liquid ammonia sufficient to produce a thin slurry. The mixture was stirred for one hour and then filtered. The filter cake of ammonium sulfate was washed with two separate portions of liquid ammonia. The combined filtrates were evaporated, leaving a residue of the free guanyl urea base, amounting to a yield of 97% of the theory.

Example 2

100 grams of triethanol amine sulfate were gradually introduced into about 300 cc. of liquid ammonia. After standing one hour, the mixture was filtered. The filter cake was suspended in 200 cc. of liquid ammonia and filtered. The filtrates were united and evaporated. The residue consisted of triethanol amine of high purity, and the yield was practically quantitative.

Example 3

93.5 grams of diethanol amine sulfate were treated with liquid ammonia in the same manner as described in Example 2. Free diethanol amine of high purity was obtained in excellent yield.

Example 4

One mol of aniline sulfate was introduced into an excess of liquid ammonia and the resulting suspension was filtered. The filter cake was resuspended in liquid ammonia and filtered. The combined filtrates on evaporation of ammonia yielded the free aniline base. The filter cake was substantially pure ammonium sulfate.

Example 5

120 grams of α-naphthylamine sulfate were treated with liquid ammonia in the same manner as described in Example 4. Free α-naphthylamine of high purity was obtained.

Example 6

An aqueous 40% nicotine sulfate solution was stirred in an excess of liquid ammonia, allowed to stand for ½ hour and then filtered. The filter cake of ammonium sulfate was washed with two separate portions of liquid ammonia. The combined filtrates upon evaporation of the ammonia separated into two phases the upper of which was aqueous ammonia and the lower a light brown oil. Upon separation the latter proved to be free nicotine base, in substantially anhydrous state.

Example 7

A 35% aqueous solution of anabasine sulfate was introduced into liquid ammonia. The resulting mixture was stirred occasionally during a period of one hour and then filtered. The filter cake of ammonium sulfate was washed with liquid ammonia. On evaporation of ammonia from the combined filtrates, two phases separated, the lower of which was free anabasine base. After separating from the supernatant liquid ammonia and evaporation of dissolved ammonia, the base was obtained as a thick yellow oil, practically anhydrous.

Example 8

To a mixture of 10 grams of brucine sulfate suspended in 200 cc. of liquid ammonia there were added 1.5 grams of diethyl amine. The resulting mixture was stirred for one hour and filtered. Upon evaporation of the filtrate only a small portion of free brucine was obtained because of its limited solubility in liquid ammonia. The filter cake was extracted with water to remove the diethyl amine sulfate, leaving the balance of the free brucine as a white powder.

Example 9

A solution of potassium amide was prepared by gradually dissolving 15 grams of metallic potassium in 200 cc. of liquid ammonia containing a crystal of ferric nitrate to act as a catalyst.

To the amide solution were added 43 grams of guanidine sulfate. The reaction mixture was agitated for one hour and filtered. The filter cake was resuspended in liquid ammonia and agitated for 15 minutes. The solid potassium sulfate was removed by pressure filtration, and the combined filtrates allowed to evaporate at room temperature leaving a residue of free guanidine base.

Example 10

In illustrating an important feature of this invention, namely, the separate production of a weak and a strong organic base from a mixture of their salts, a dry mixture of 100 grams each of guanyl urea sulfate and guanidine sulfate was added to 500 cc. of liquid ammonia. The mixture was stirred for one hour and filtered. The filter cake was washed with liquid ammonia. The combined filtrates were evaporated, leaving a residue of the free guanyl urea base only.

The filter cake was gradually added to a solution of 81 grams of potassium amide in 300 cc. of liquid ammonia. The mixture was stirred for ½ hour and filtered. The filter cake was resuspended in liquid ammonia and filtered. The combined filtrates on evaporation of the ammonia yielded the free guanidine base.

The liberation of free organic bases from their salts as illustrated in the preceding examples may be carried out in liquid ammonia at normal pressure or at such a temperature and under the corresponding pressure that no reaction of ammonia and the free base takes place.

The present invention comprehends the production of all free aliphatic, aromatic and heterocyclic bases, and is particularly applicable to the production of bases which are notoriously thermo unstable or are solid at room temperature and volatilize with great difficulty.

In addition to the free bases prepared in the above examples, other organic bases which may be liberated from their salts are dimethyl and trimethyl guanidine, dibutyl guanidine, mono, di and triphenyl guanidine, ditolyl guanidine, mono, di and triethanol guanidine, mono and dimethyl guanyl urea, diphenyl guanyl urea, tetraethyl guanyl urea, triethanol guanyl urea, biguanid, phenyl biguanid, mono and dimethyl biguanid, diethyl biguanid, diamyl biguanid, 1.5 diallyl biguanid, 1.1.5.5 tetramethyl biguanid, 1.1.2 trimethyl biguanid, 1.2.3 triphenyl biguanid, alkyl, alkylol, alkylene, aralkyl, and alicyclic amines, phenyl hydrazine, toluidine, benzidine, diphenyl amine, ortho, meta and para nitroaniline, ortho, meta and para hydroxy aniline, pyridine, piperidine, quinoline, picoline, lutidine, collidine, isoquinoline, quinaldine, acridine, carbazole and naphthoquinaldine.

It is obvious that the process of this invention which is capable of isolating the free base at very low temperatures and without the use of water has a decided advantage over processes in which solutions of the free base in water or organic solvents have to be concentrated under vacuum in order to recover the solid base. The reaction is very smooth and yields are practically quantitative. A further advantage resides in the fact that a substantially pure, crystalline salt is obtained as a by-product, such as for example ammonium sulfate in the liberation of a free base from its sulfate salt, rather than the voluminous calcium or barium sulfate sludges encountered in former methods.

While the invention has been described with particular reference to specific embodiments, it is to be understood that it is not to be limited thereto but is to be construed broadly and restricted solely by the scope of the appended claims.

I claim:

1. In a method of preparing a free aliphatic base from a salt thereof by the action thereon of a causticizing reagent stronger than the base to be freed, where the causticizing reagent is chosen from the group consisting of alkali metal amides, and compounds of the type $NR_1R_2R_3$, the R's being chosen from the group consisting of hydrogen, alkyl, aryl, alkylol and aralkyl radicals, the improvement which includes carrying out the base-freeing reaction in a solvent medium for the base, containing not less than 60% ammonia, and at a temperature below that at which ammonia will react with the base thus set free, and recovering the free aliphatic base from its solution in the solvent medium.

2. A method of producing free guanyl urea which comprises subjecting guanyl urea sulfate to the action of liquid ammonia in a concentration such that ammonium sulfate and free guanyl urea are formed, the former being insoluble in the ammonia and the latter soluble, filtering and recovering the free guanyl urea from the filtrate.

3. In a method of preparing free guanyl urea from a salt thereof by the action thereon of a causticizing reagent stronger than guanyl urea, where the causticizing reagent is chosen from the group consisting of alkali metal amides, and compounds of the type $NR_1R_2R_3$, the R's being chosen from the group consisting of hydrogen, alkyl, aryl, alkylol and aralkyl radicals, the improvement which includes carrying out the guanyl urea-freeing reaction in a solvent medium for guanyl urea, containing not less than 60% ammonia, and at a temperature below that at which ammonia will react with free guanyl urea, and recovering guanyl urea from its solution in the solvent.

WILLIAM H. HILL.